(12) United States Patent
Watabe

(10) Patent No.: US 12,101,445 B2
(45) Date of Patent: Sep. 24, 2024

(54) IMAGE FORMING APPARATUS AND METHOD OF CONTROLLING IMAGE FORMING APPARATUS WHICH ADAPT TO VARIOUS OSES/IPP PRINT FUNCTIONS

(71) Applicant: SHARP KABUSHIKI KAISHA, Sakai (JP)

(72) Inventor: Tatsuya Watabe, Sakai (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 18/386,022

(22) Filed: Nov. 1, 2023

(65) Prior Publication Data

US 2024/0163379 A1     May 16, 2024

(30) Foreign Application Priority Data

Nov. 11, 2022   (JP) ................................. 2022-181177

(51) Int. Cl.
     *H04N 1/00*        (2006.01)
     *H04N 1/32*        (2006.01)

(52) U.S. Cl.
     CPC ..... *H04N 1/00217* (2013.01); *H04N 1/00938* (2013.01); *H04N 1/32117* (2013.01); *H04N 2201/0046* (2013.01)

(58) Field of Classification Search
     CPC ........... H04N 1/00217; H04N 1/00938; H04N 1/32117; H04N 2201/0046
See application file for complete search history.

(56) References Cited

U.S. PATENT DOCUMENTS

2021/0004186 A1*   1/2021   Kanno .................. G06F 3/1231

FOREIGN PATENT DOCUMENTS

| JP | 2016-126444 A | 7/2016 |
|---|---|---|
| JP | 2021-178511 A | 11/2021 |

* cited by examiner

*Primary Examiner* — Nicholas Pachol
(74) *Attorney, Agent, or Firm* — ScienBiziP, P.C.

(57) ABSTRACT

An image forming apparatus according to an embodiment includes: a communicator; an image former; a storage; a packet data analyzer; and a controller which controls the communicator, the image former, the storage, and the packet data analyzer. When the communicator receives packet data of a print protocol from a user terminal, the controller causes the packet data analyzer to analyze the packet data and specify the type of operating system of the user terminal, decides on a print operation based on the print protocol associated with the operating system, and then causes the image former to form an image that the communicator has received from the user terminal.

6 Claims, 17 Drawing Sheets

```
OS SETTING   iOS14 SETTINGS

IPP FUNCTION
         FINISHING              ● ON      ○ OFF
         PUNCH                  ● ON      ○ OFF
            TWO HOLES ON LEFT   ● ON      ○ OFF
            THREE HOLES ON LEFT ○ ON      ● OFF
            FOUR HOLES ON LEFT  ○ ON      ● OFF
         STAPLE                 ● ON      ○ OFF
            UPPER LEFT          ● ON      ○ OFF
            TWO HOLES ON LEFT   ○ ON      ● OFF

[ OK ]    [ CANCEL ]
```

FIG. 4

```
POST /ipp/print HTTP/1.1
Content-Length: 833
Content-Type: application/ipp
Date: Tue, 08 Mar 2022 00:37:28 GMT
Host: sharp-bp-60c31--ipp.local:631
User-Agent: CUPS/2.3.4 (iOS 14.7.1; iPhone12,1) IPP/2.0
Expect: 100-continue
```

FIG. 5

| OS | IPP FUNCTION | | | | | | | | |
|---|---|---|---|---|---|---|---|---|---|
| | FINISHING | | | | | | | | |
| | | PUNCH | | | | | STAPLE | | |
| | | | TWO HOLES ON LEFT | THREE HOLES ON LEFT | FOUR HOLES ON LEFT | | | UPPER LEFT | TWO PLACES ON LEFT |
| iOS13 OR EARLIER VERSION | ON | OFF | OFF | OFF | OFF | | ON | ON | OFF |
| iOS14 | ON | ON | ON | OFF | OFF | | ON | ON | OFF |
| iOS15 OR LATER VERSION | ON | ON | OFF | ON | ON | | ON | ON | ON |
| Mac OS 10.14 OR EARLIER VERSION | OFF | OFF | OFF | OFF | OFF | | OFF | OFF | OFF |
| Mac OS 10.15 | ON | OFF | OFF | OFF | OFF | | ON | ON | OFF |
| Mac OS 11 OR LATER VERSION | ON | ON | ON | ON | ON | | ON | ON | ON |
| Chrome OS 98 OR EARLIER VERSION | OFF | OFF | OFF | OFF | OFF | | OFF | OFF | OFF |
| Chrome OS 99 | ON | ON | ON | ON | ON | | ON | ON | OFF |
| Chrome OS 100 OR LATER VERSION | ON | OFF | OFF | OFF | OFF | | OFF | OFF | OFF |
| Windows 10 | OFF | OFF | OFF | OFF | OFF | | OFF | OFF | OFF |
| Windows 11 | ON | ON | ON | OFF | OFF | | ON | ON | OFF |
| DEFAULT OS | ON | OFF | OFF | OFF | OFF | | ON | ON | OFF |

FIG. 6

| IP ADDRESS/MAC ADDRESS OF USER TERMINAL | OS/PRINT PROTOCOL | PRINT PROTOCOL | OPERATION OF MULTIFUNCTION PERIPHERAL |
|---|---|---|---|
| 10.36.108.103 | iOS14 | AirPrint | OPERATION FOR iOS14 |
| 10.36.108.211 | MacOS 10.14 | AirPrint | OPERATION FOR MacOS 10.14 |
| 10.36.108.222 | AirPrint | AirPrint | OPERATION OF AirPrint (Default) |
| E1:33:44:ad:ce:8a | Chrome OS 85 | IPP Everywhere | OPERATION FOR Chrome OS 85 |
| 10.36.108.229 | Windows 11 | PSA | OPERATION FOR Windows 11 |

FIG. 7

OS SETTING LIST

PLEASE SELECT OS TO BE SET
- ○ iOS13 OR EARLIER VERSION
- ● iOS14
- ○ iOS15 OR LATER VERSION
- ○ Mac OS 10.14 OR EARLIER VERSION
- ○ Mac OS 10.15
- ○ Mac OS 11 OR LATER VERSION
- ○ Chrome OS 98 OR EARLIER VERSION
- ○ Chrome OS 99
- ○ Chrome OS 100 OR LATER VERSION
- ○ Windows 10
- ○ Windows 11
- ○ DEFAULT OS
- ○ CUSTOM OS 1

- ○ ADD CUSTOM OS

[ OK ]  [ CANCEL ]

FIG. 8

```
OS SETTING   iOS14 SETTINGS

IPP FUNCTION
         FINISHING              ● ON      ○ OFF
         PUNCH                  ● ON      ○ OFF
            TWO HOLES ON LEFT   ● ON      ○ OFF
            THREE HOLES ON LEFT ○ ON      ● OFF
            FOUR HOLES ON LEFT  ○ ON      ● OFF
         STAPLE                 ● ON      ○ OFF
            UPPER LEFT          ● ON      ○ OFF
            TWO HOLES ON LEFT   ○ ON      ● OFF
```

[ OK ]   [ CANCEL ]

FIG. 9

OS SETTING  CUSTOM OS ADDITION

NAME  [ CUSTOM OS 2 ]

IPP FUNCTION
- FINISHING ● ON ○ OFF
- PUNCH ○ ON ● OFF
  - TWO HOLES ON LEFT ○ ON ● OFF
  - THREE HOLES ON LEFT ○ ON ● OFF
  - FOUR HOLES ON LEFT ○ ON ● OFF
- STAPLE ● ON ○ OFF
  - UPPER LEFT ● ON ○ OFF
  - TWO HOLES ON LEFT ○ ON ● OFF

[ OK ]  [ CANCEL ]

FIG. 10

OS SETTING  CUSTOM OS DELETION

PLEASE SELECT OS TO BE DELETED
- ○ CUSTOM OS 1
- ○ CUSTOM OS 2
- ● OS OF TANAKA'S PC AT SALES DEPARTMENT
- ○ OS OF SHIMIZU'S PC AT DEVELOPMENT DEPARTMENT
- ○ OS OF PLANNING DEPARTMENT'S PC

[ OK ]  [ CANCEL ]

FIG. 11

DEVICE SETTING LIST

PLEASE SELECT DEVICE

| | IP ADDRESS/MAC ADDRESS | OS |
|---|---|---|
| ○ | 192.168.225.30 | iOS14 |
| ○ | 192.168.7.124 | Chrome OS 99 |
| ○ | 10.36.100.238 | Mac OS 10.14 OR EARLIER VERSION |
| ○ | 10.36.65.99 | Mac OS 10.14 OR EARLIER VERSION |
| ● | 10.36.45.185 | Windows 11 |
| ○ | 88:77:88:df:ef:ab | Mac OS 11 OR LATER VERSION |
| ○ | b1:45:72:11:44:aa | Chrome OS 98 OR EARLIER VERSION |
| ○ | 10.36.100.104 | Windows 10 |
| ○ | 192.168.8.236 | DEFAULT OS |
| ○ | 10.36.45.190 | OS OF PLANNING DEPARTMENT'S PC |
| ○ | 77:33:11:bb:de:ca | Windows 11 |

○ ADD DEVICE

[ OK ]  [ CANCEL ]

FIG. 12

DEVICE SETTING  EDITING OF DEVICE INFORMATION

IP ADDRESS/MAC ADDRESS    10.36.45.185

OS                        Windows 11 ▽

OK    CANCEL

FIG. 13

DEVICE SETTING  ADDITION OF DEVICE INFORMATION

IP ADDRESS/MAC ADDRESS    [          ]

OS                        DEFAULT OS ▽

OK    CANCEL

FIG. 14

DEVICE SETTING  DELETION OF DEVICE INFORMATION

PLEASE SELECT DEVICE TO BE DELETED

| | IP ADDRESS/MAC ADDRESS | OS |
|---|---|---|
| ○ | 192.168.225.30 | iOS14 |
| ○ | 192.168.7.124 | Chrome OS 99 |
| ○ | 10.36.100.238 | Mac OS 10.14 OR EARLIER VERSION |
| ○ | 10.36.65.99 | Mac OS 10.14 OR EARLIER VERSION |
| ● | 10.36.45.185 | Windows 11 |
| ○ | 88:77:88:df:ef:ab | Mac OS 11 OR LATER VERSION |
| ○ | b1:45:72:11:44:aa | Chrome OS 98 OR EARLIER VERSION |
| ○ | 10.36.100.104 | Windows 10 |
| ○ | 192.168.8.236 | DEFAULT OS |
| ○ | 10.36.45.190 | OS OF PLANNING DEPARTMENT'S PC |
| ○ | 77:33:11:bb:de:ca | Windows 11 |

[ OK ]  [ CANCEL ]

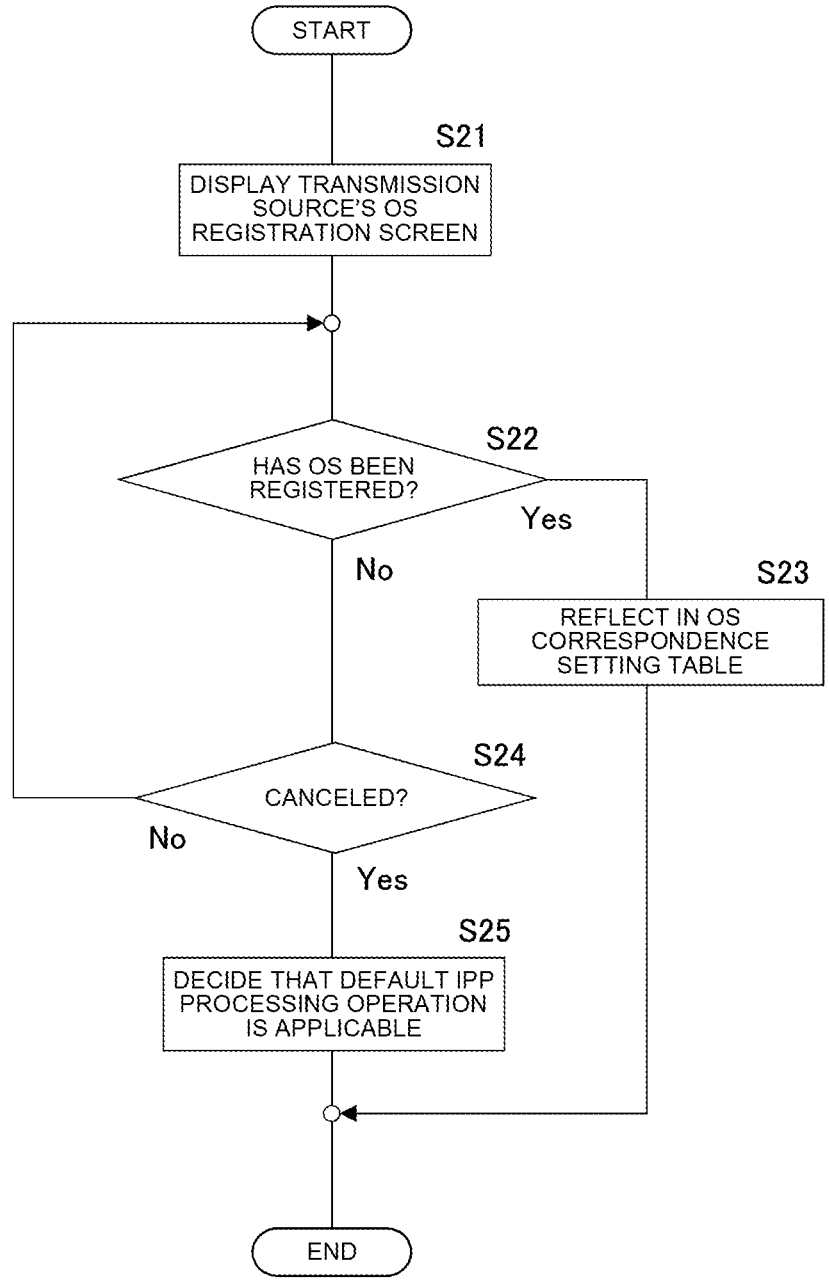

FIG. 17

IPP PACKET HAS BEEN RECEIVED FROM A DEVICE HAVING IP ADDRESS (192.168.12.84) - MAC ADDRESS (81:da:cf:52:33:12). PLEASE SELECT THE OS OF THE DEVICE.

- ○ iOS13 OR EARLIER VERSION
- ○ iOS14
- ● iOS15 OR LATER VERSION
- ○ Mac OS 10.14 OR EARLIER VERSION
- ○ Mac OS 10.15
- ○ Mac OS 11 OR LATER VERSION
- ○ Chrome OS 98 OR EARLIER VERSION
- ○ Chrome OS 99
- ○ Chrome OS 100 OR LATER VERSION
- ○ Windows 10
- ○ Windows 11
- ○ OTHER OS ☑ ADDRESS TO BE REGISTERED
- ● IP ADDRESS (192.168.12.84)
- ○ MAC ADDRESS (81:da:cf:52:33:12)

[ OK ]  [ CANCEL ]

FIG. 20 mDNS PACKET HAS BEEN RECEIVED FROM A DEVICE HAVING IP ADDRESS (192.168.12.84) - MAC ADDRESS (81:da:cf:52:33:12).
DO YOU WANT TO REGISTER THE OS OF THE DEVICE?

[REGISTER] [DO NOT REGISTER]

FIG. 21

OS TO BE REGISTERED
- ○ iOS13 OR EARLIER VERSION
- ○ iOS14
- ● iOS15 OR LATER VERSION
- ○ Mac OS 10.14 OR EARLIER VERSION
- ○ Mac OS 10.15
- ○ Mac OS 11 OR LATER VERSION
- ○ Chrome OS 98 OR EARLIER VERSION
- ○ Chrome OS 99
- ○ Chrome OS 100 OR LATER VERSION
- ○ Windows 10
- ○ Windows 11
- ○ OTHER OS ADDRESS TO BE REGISTERED
PLEASE SELECT THE ADDRESS TO BE REGISTERED IN ASSOCIATION WITH THE ABOVE OS

- ● IP ADDRESS (192.168.12.84)
- ○ MAC ADDRESS (81:da:cf:52:33:12)

[OK] [CANCEL]

IMAGE FORMING APPARATUS AND METHOD OF CONTROLLING IMAGE FORMING APPARATUS WHICH ADAPT TO VARIOUS OSES/IPP PRINT FUNCTIONS

CROSS-REFERENCE TO RELATED APPLICATION

The present application claims priority from Japanese Application JP2022-181177, the content to which is hereby incorporated by reference into this application.

BACKGROUND OF THE INVENTION

1. Field of the Invention

The present disclosure relates to an image forming apparatus and a method of controlling an image forming apparatus, and more particularly, to an image forming apparatus which forms an image on the basis of image data received from an external terminal via a network and a method of controlling an image forming apparatus.

2. Description of the Related Art

Recently, Internet Printing Protocol (IPP), which is a standard for performing printing via a network using a Hypertext Transfer Protocol (HTTP) protocol, has been proposed by the Printer Working Group (PWG), and image forming apparatuses equipped with an IPP print function to perform printing using the IPP are known.

By using the IPP print function, it becomes possible for a user to execute printing by any type of image forming apparatus on a network even without using a printer driver.

There exist a plurality of standards for performing such IPP printing (see, for example, Table 1 below), and these standards implement a search for a printer by Multicast Domain Name System (mDNS) and perform print communication by the IPP. These standards have similar functions.

However, in each operating system (OS) that adopts the standard, IPP implementation is different, and therefore the operation of the IPP in response to a print instruction from the user may also be different.

Further, even in the case of the same type of OS, the operation may be different if the version of the OS is different.

The major standards and OSes for performing the IPP printing are indicated in Table 1 below.

TABLE 1

| Standard | OS | Adopted Maker | Technology used |
| --- | --- | --- | --- |
| AirPrint | Apple Mac OS, iOS, iPad OS | Apple | IPP, mDNS |
| IPP Everywhere | Chrome OS | Google | IPP, mDNS |
| Mopria | Windows | Microsoft | IPP, mDNS |

Here, IPP printing based on functions equipped as standard in an image forming apparatus (a printer), such as the number of copies, double-sided printing, color, and resolution, is implementation in common to each of the development makers of printers. However, as regards a special function that depends on the hardware processing capability of a printer such as a paper discharge function, the implementation is often different by the company.

These IPP print functions perform a search for a printer by the mDNS, acquire a printer capability by using the Get-Printer-Attributes operation of the IPP, and make a print request by the Print-Job operation, Create-Job operation, or Send-Document operation of the IPP.

Here, the printer capability refers to, for example, color/grayscale, paper feed tray configuration, paper discharge tray configuration, finishing, paper size, paper type, resolution, single-sided/double-sided, print quality, page aggregation, and the number of copies.

A user terminal which has obtained the printer capability information can display a user interface (UI) corresponding to the printer capability to the user. For example, if the image forming apparatus supports double-sided printing, options for prompting the user to select single-sided printing or double-sided printing can be displayed in Printer Properties. Meanwhile, even if the function is one supported by the image forming apparatus, if the OS of the user terminal cannot recognize the function or does not support the function, an option related to the function is not reflected in the UI.

Many printers that are available these days adapt to an mDNS search function and an IPP print function. However, because of the circumstances as described above, there are a case where the processing may be performed as intended by the user and a case where the processing may not be performed as intended by the user.

Incidentally, as a technique related to a printer having such an IPP print function, there has been proposed a printing apparatus which, even when the printing apparatus has been in the state (OFF) of not executing printing using the IPP when the setting of a first type of software (a pwg-raster application) is changed to ON from OFF and the printing apparatus is changed to be in the state of executing the printing based on the relevant data, performs control to automatically change the printing apparatus to be in the state (ON) of executing the printing using the IPP, thereby reducing the time and effort for the user to change the settings individually.

In addition, there has been proposed an image forming system which determines, when an IPP print condition is received from a terminal by using the IPP, whether or not a web print condition is associated with session information of the terminal, and when the web print condition is associated with the session information, printing is executed under a print condition based on the two print conditions.

SUMMARY OF THE INVENTION

However, a method of employing automatic setting for the IPP, HTTP, and mDNS settings, thereby eliminating the setting work by the user, and improving the convenience of IPP printing is not adaptable to operation failure of the image forming apparatus in the IPP printing that is caused by some of the OSes.

In addition, some print conditions executable by the image forming apparatus cannot be set through a UI of the IPP print function of an external terminal, and this problem is aimed to be resolved. However, since the OSes are not necessarily the same for all of the external terminals, it is not possible to resolve the operation failure of the image forming apparatus based on the IPP print function that is caused according to each OS.

The present disclosure has been made in view of the circumstances as described above, and an object of the present disclosure is to provide an image forming apparatus and a method of controlling an image forming apparatus which adapt to various OSes/IPP print functions in IPP communication, and can execute a more appropriate IPP print operation than those executed in the past.

The present disclosure provides an image forming apparatus including: a communicator which transmits and receives various kinds of data to and from an external user terminal via a network; an image former which forms an image based on image data received from the user terminal; a storage which stores a first correspondence table in which a print operation based on a predetermined print protocol is associated for each of various operating systems of the user terminal; a packet data analyzer which analyzes packet data of the print protocol; and one or more controllers which control the communicator, the image former, the storage, and the packet data analyzer, in which: when the communicator receives packet data of the print protocol from the user terminal, the one or more controllers cause the packet data analyzer to analyze the packet data and specify a type of the operating system of the user terminal; when the type of the operating system of the user terminal was able to be specified, the one or more controllers decide on the print operation based on the print protocol associated with the operating system by referring to the first correspondence table; and when the communicator receives image data by the print protocol from the user terminal thereafter, the one or more controllers cause the image former to form an image based on the image data in accordance with the print operation that has been decided.

In addition, the present disclosure provides a method of controlling an image forming apparatus, the method including: transmitting and receiving various kinds of data to and from an external user terminal via a network; forming an image based on image data received from the user terminal; storing a first correspondence table in which a print operation based on a predetermined print protocol is associated for each of various operating systems of the user terminal; analyzing packet data of the print protocol; specifying, when packet data of the print protocol is received from the user terminal, a type of the operating system of the user terminal by analyzing the packet data; deciding on, when the type of the operating system of the user terminal was able to be specified, the print operation based on the print protocol associated with the operating system by referring to the first correspondence table; and forming, when image data is received by the print protocol from the user terminal thereafter, an image based on the image data in accordance with the print operation that has been decided.

According to the present disclosure, it is possible to realize an image forming apparatus and a method of controlling an image forming apparatus which adapt to various OSes/IPP print functions in IPP communication, and can execute a more appropriate IPP print operation than those executed in the past.

BRIEF DESCRIPTION OF THE DRAWINGS

FIG. 4 illustrates an example of an IPP packet received by the digital multifunction peripheral shown in FIG. 1.

FIG. 5 illustrates an example of an OS correspondence setting table stored by the digital multifunction peripheral shown in FIG. 1.

FIG. 6 illustrates an example of a user terminal-and-OS/print protocol correspondence setting table stored by the digital multifunction peripheral shown in FIG. 1.

FIG. 7 illustrates an example of a setting screen for the OS correspondence setting table that is displayed on the digital multifunction peripheral shown in FIG. 1.

FIG. 8 illustrates an example of a setting change screen for an IPP function in the OS correspondence setting table that is displayed on the digital multifunction peripheral shown in FIG. 1.

FIG. 9 illustrates an example of a setting screen for addition of a custom OS to the OS correspondence setting table that is displayed on the digital multifunction peripheral shown in FIG. 1.

FIG. 10 illustrates an example of a setting screen for deletion of a custom OS from the OS correspondence setting table that is displayed on the digital multifunction peripheral shown in FIG. 1.

FIG. 11 illustrates an example of a setting screen for the user terminal-and-OS/print protocol correspondence setting table that is displayed on the digital multifunction peripheral shown in FIG. 1.

FIG. 12 illustrates an example of an edit screen for device information in the user terminal-and-OS/print protocol correspondence setting table that is displayed on the digital multifunction peripheral shown in FIG. 1.

FIG. 13 illustrates an example of an addition screen for adding device information in the user terminal-and-OS/print protocol correspondence setting table that is displayed on the digital multifunction peripheral shown in FIG. 1.

FIG. 14 illustrates an example of a deletion screen for deleting device information in the user terminal-and-OS/print protocol correspondence setting table that is displayed on the digital multifunction peripheral shown in FIG. 1.

FIG. 16 is a flowchart illustrating an example of a flow of transmission source OS registration guidance processing that is executed by the digital multifunction peripheral according to Embodiment 2 of the present disclosure.

FIG. 17 illustrates an example of a transmission source OS registration screen that is displayed on the digital multifunction peripheral according to Embodiment 2 of the present disclosure.

FIG. 20 illustrates an example of a dialog relating to registration of a transmission source OS that is displayed on the digital multifunction peripheral according to Embodiment 3 of the present disclosure.

FIG. 21 illustrates an example of a transmission source OS registration screen that is displayed on the digital multifunction peripheral according to Embodiment 3 of the present disclosure.

DETAILED DESCRIPTION OF THE INVENTION

Figure 1:
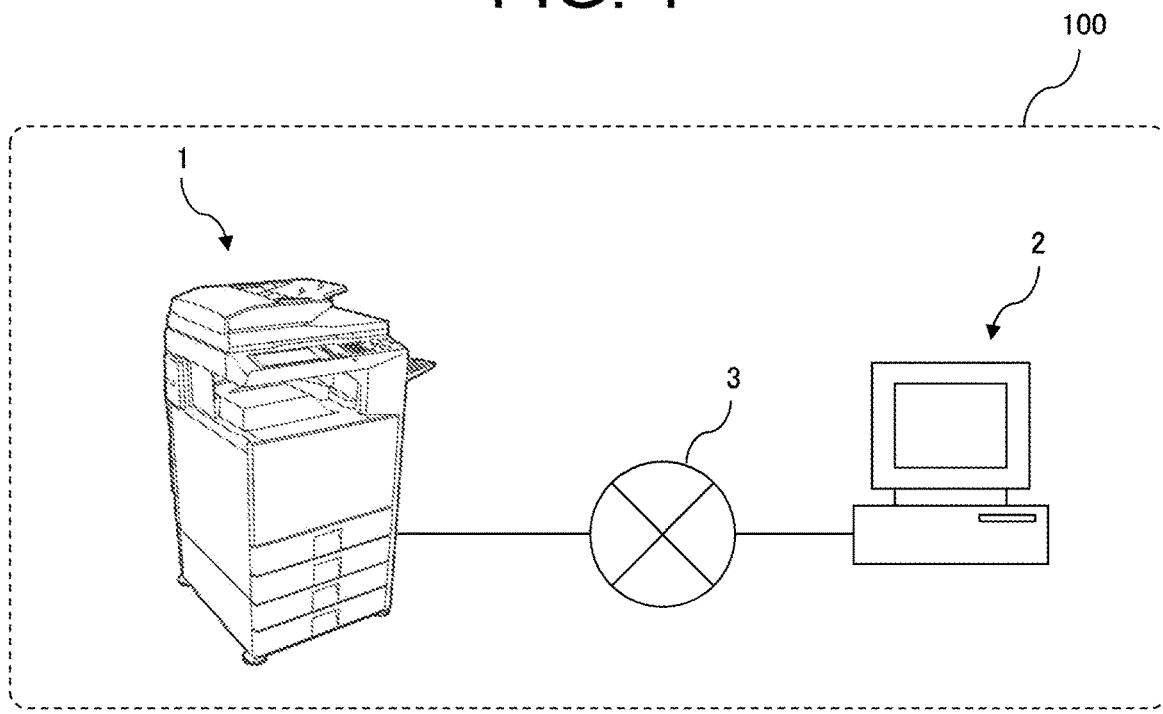
FIG. 1 is an explanatory diagram illustrating an example of a configuration of an image forming system including a digital multifunction peripheral of the present disclosure.

In the present disclosure, the "image forming apparatus" refers to an apparatus which forms and outputs an image, in which the apparatus includes a copying machine having a copying (copy) function such as a printer using an electrophotographic method for image formation with toner, and a multifunction peripheral (MFP) which also includes functions other than the copying function.

The "print protocol" refers to a protocol, such as IPP, which is a standard for performing printing via a network using an HTTP protocol, for enabling communication between a user terminal and an image forming apparatus when the image forming apparatus is made to execute printing from the user terminal.

The "operating system of the user terminal" refers to a system, such as an OS of the user terminal, which manages and operates the user terminal, and causes various applications including a printing application to be run.

The "print operation" refers to an operation of various kinds of print processing, such as punching and stapling, based on the print protocol.

The "first correspondence table" is implemented by, for example, an OS correspondence setting table according to Embodiment 1 of the present disclosure.

Further, preferred modes of the present disclosure will be described.

The storage may further store a second correspondence table in which the operating system of the user terminal is associated for each address of the user terminal, and when the one or more controllers were unable to specify the type of the operating system of the user terminal, the one or more controllers may specify the address of the user terminal, refer to the second correspondence table, and specify the operating system associated with the address, and then may refer to the first correspondence table and decide on the print operation based on the print protocol associated with the operating system.

By doing so, in the IPP communication, when the OS of the transmission source that transmits image data cannot be specified from the IPP packet data, an OS associated with an IP/MAC address of the transmission source is specified with reference to the second correspondence table, an IPP print operation associated with the OS is decided with reference to the first correspondence table, and printing is executed. Therefore, it is possible to realize the image forming apparatus which is capable of executing a more appropriate IPP print operation than those executed in the past by adapting to the type of OS of the transmission source that transmits the image data.

The "second correspondence table" is implemented by, for example, a user terminal-and-OS/print protocol correspondence setting table according to Embodiment 1 of the present disclosure.

The first correspondence table may further store a correspondence relationship between a default operating system and a print operation based on the print protocol, and when the one or more controllers were unable to specify the type of the operating system of the user terminal from a result of analysis of the packet data and the address of the user terminal, the one or more controllers may assume the operating system of the user terminal as the default operating system, and decide on the print operation based on the print protocol associated with the operating system by referring to the first correspondence table.

By doing so, in the IPP communication, when the OS of the transmission source that transmits image data cannot be specified from the IPP packet data, based on the assumption that the OS of the user terminal in question is a default OS, an IPP print operation associated with the default OS is decided and the printing is executed. Therefore, it is possible to realize the image forming apparatus which is capable of executing a more appropriate IPP print operation than those executed in the past even in a case where the type of OS of the transmission source that transmits the image data cannot be specified.

A preferred mode of the present disclosure may further include a display which displays various kinds of information to a user, and an operation receiver which receives an input operation from the user, and when the one or more controllers were unable to specify the type of the operating system of the user terminal from a result of analysis of the packet data and the address of the user terminal, the one or more controllers may cause the display to display a list of the operating systems such that the operating system is selectable by the user, and specify, based on a result of input from the user received by the operation receiver, the type of the operating system of the user terminal.

By doing so, in the IPP communication, when the OS of the transmission source that transmits image data cannot be specified from the IPP packet data, the display is made to display a list of OSes such that an OS is selectable by the user, and the OS is specified on the basis of a result of input from the user that has been received by the operation receiver. Therefore, it is possible to realize the image forming apparatus which is capable of executing a more appropriate IPP print operation than those executed in the past by adapting to the type of OS of the transmission source that transmits the image data.

A preferred mode of the present disclosure may further include a display which displays various kinds of information to a user, and an operation receiver which receives an input operation from the user, in which when the communicator receives predetermined search packet data from the user terminal, the one or more controllers may specify the address of the user terminal, and when the address is not included in the second correspondence table, the one or more controllers may cause the display to display a list of the operating systems such that the operating system is selectable by the user, and specify, based on a result of input from the user received by the operation receiver, the type of the operating system of the user terminal.

By doing so, when the communicator receives the predetermined search packet such as an mDNS packet, and an IP/MAC address of the transmission source is unregistered, the display is made to display a list of OSes such that an OS is selectable by the user, and the OS is specified on the basis of a result of input from the user that has been received by the operation receiver. Therefore, it is possible to realize the image forming apparatus which is capable of executing a more appropriate IPP print operation than those executed in the past by adapting to the type of OS of the transmission source that transmits the image data.

The present disclosure will now be described in more detail with reference to the accompanying drawings. The following description is illustrative in all respects and should not be construed as limiting the present disclosure.

Embodiment 1

Schematic Configuration of Digital Multifunction Peripheral 1

A digital multifunction peripheral 1 according to Embodiment 1 of the present disclosure will be described with reference to FIGS. 1 and 2.

FIG. 1 is an explanatory diagram illustrating an example of a configuration of an image forming system 100 including the digital multifunction peripheral 1 of the present disclosure.

As illustrated in FIG. 1, in the image forming system 100 of the present disclosure, the digital multifunction peripheral 1 is connected to a user terminal 2 via a wired or wireless network 3.

The digital multifunction peripheral 1 is an image forming apparatus such as a multifunction peripheral or an MFP that digitally processes image data and has a copy function, a printer function, a scanner function, and a facsimile function.

The user terminal 2 is a terminal such as a personal computer (PC) or a tablet, or a mobile terminal such as a smartphone.

The user terminal 2 transmits and receives image data to and from the digital multifunction peripheral 1 via the network 3.

Figure 2:
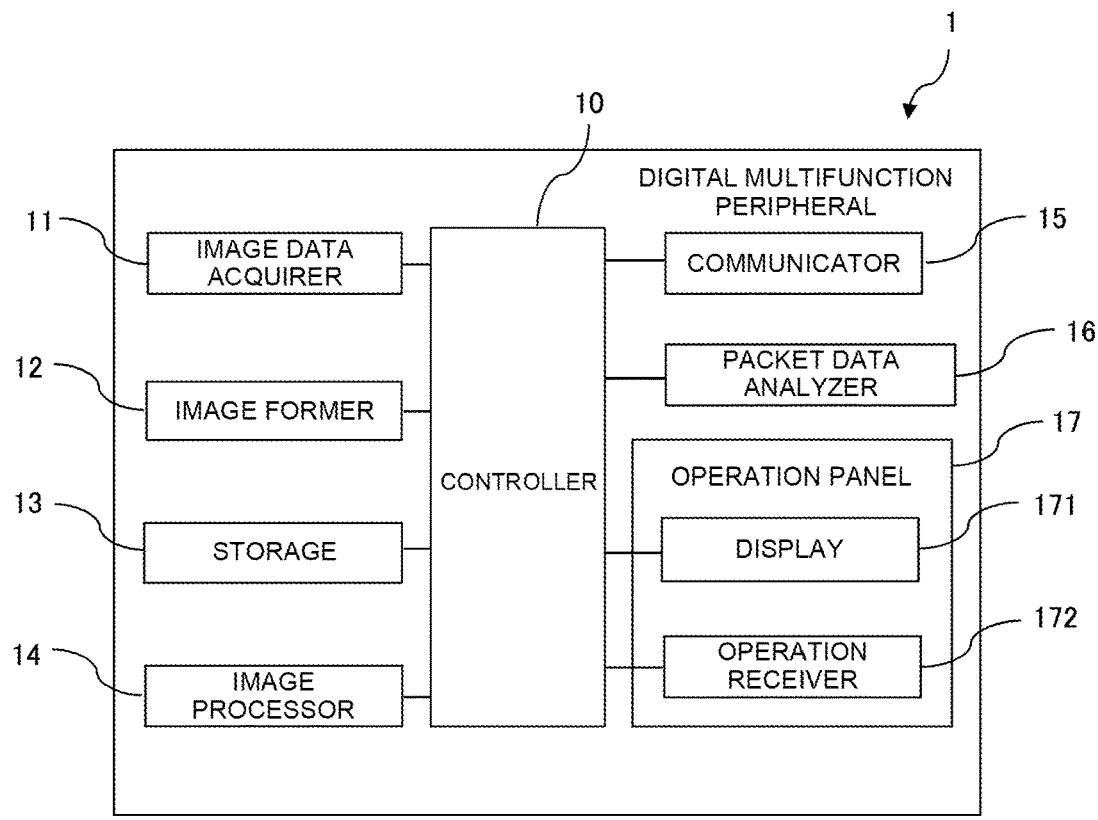
FIG. 2 is an explanatory diagram illustrating a schematic configuration of the digital multifunction peripheral of FIG. 1.

FIG. 2 is an explanatory diagram illustrating a schematic configuration of the digital multifunction peripheral 1 of FIG. 1.

As illustrated in FIG. 2, the digital multifunction peripheral 1 is provided with a controller 10, an image data acquirer 11, an image former 12, a storage 13, an image processor 14, a communicator 15, a packet data analyzer 16, and an operation panel 17.

In the following, constituent elements of the digital multifunction peripheral 1 will be described.

The controller 10 controls the digital multifunction peripheral 1 in an integrated manner, and is configured from a central processing unit (CPU), a random-access memory (RAM), a read-only memory (ROM), various interface circuits, and the like.

In order to control the operation of the digital multifunction peripheral 1 as a whole, the controller 10 monitors and controls detection of each sensor and all loads on a motor, a clutch, the operation panel 17, and the like.

The image data acquirer 11 is a portion which acquires image data received from an external device via the network 3.

The image former 12 is a portion which prints and outputs, on a sheet of paper, an image based on image data that has been acquired by the image data acquirer 11 and processed by the image processor 14.

The storage 13 is an element or a storage medium which stores information necessary for implementing various functions of the digital multifunction peripheral 1, and a control program, etc. For example, a semiconductor device such as a RAM and a ROM, and a storage medium such as a hard disk, a flash storage, or a solid state drive (SSD) are used.

Note that a program and data may be held in different devices such as that an area for holding the data is configured by a hard disk drive and an area for holding the program is configured by a flash storage.

The image processor 14 is a portion which processes, on the basis of a result of analysis of a job command of printing and the like acquired from a user terminal, etc., via the communicator 15 or a job command of printing and the like input from an operation receiver 172, image data that has been input from the image data acquirer 11 such that the image data is suitable for output including enlargement and reduction by converting the image data into an appropriate electric signal.

The communicator 15 is a portion which communicates with external devices such as the user terminal 2 and the like via the network 3, and transmits and receives data, for example, to and from these external devices.

The packet data analyzer 16 is a portion which analyzes packet data such as an IPP packet or an mDNS packet that has been received by the communicator 15.

The operation panel 17 is configured from a display panel composed of a liquid crystal panel, etc., and a touch panel, which is arranged to overlap the display panel, and employs a capacitive sensing method or the like that detects a position touched by a finger. The operation panel 17 is provided with a display 171 and the operation receiver 172.

The display 171 is a portion which displays various kinds of information.

The display 171 is configured from, for example, a CRT display, a liquid crystal display, or an EL display, and is a display device such as a monitor or a line display for an operating system or application software to display electronic data such as a processing state.

The controller 10 displays, via the display 171, the operation and the state of the digital multifunction peripheral 1.

The operation receiver 172 is an interface for operating the digital multifunction peripheral 1, and is a portion which receives a command from a user.

It is acceptable if not whole of the operation receiver 172 adapts to a touch panel operation. In other words, a part of or whole of the operation receiver 172 may be composed of a physical key independent of the display 171.

Flow of IPP Print Processing of Digital Multifunction Peripheral 1 According to Embodiment 1 of Present Disclosure Next, referring to FIGS. 3 to 6, a flow of IPP print processing that is executed by the digital multifunction peripheral 1 according to Embodiment 1 of the present disclosure will be described.

Figure 3:
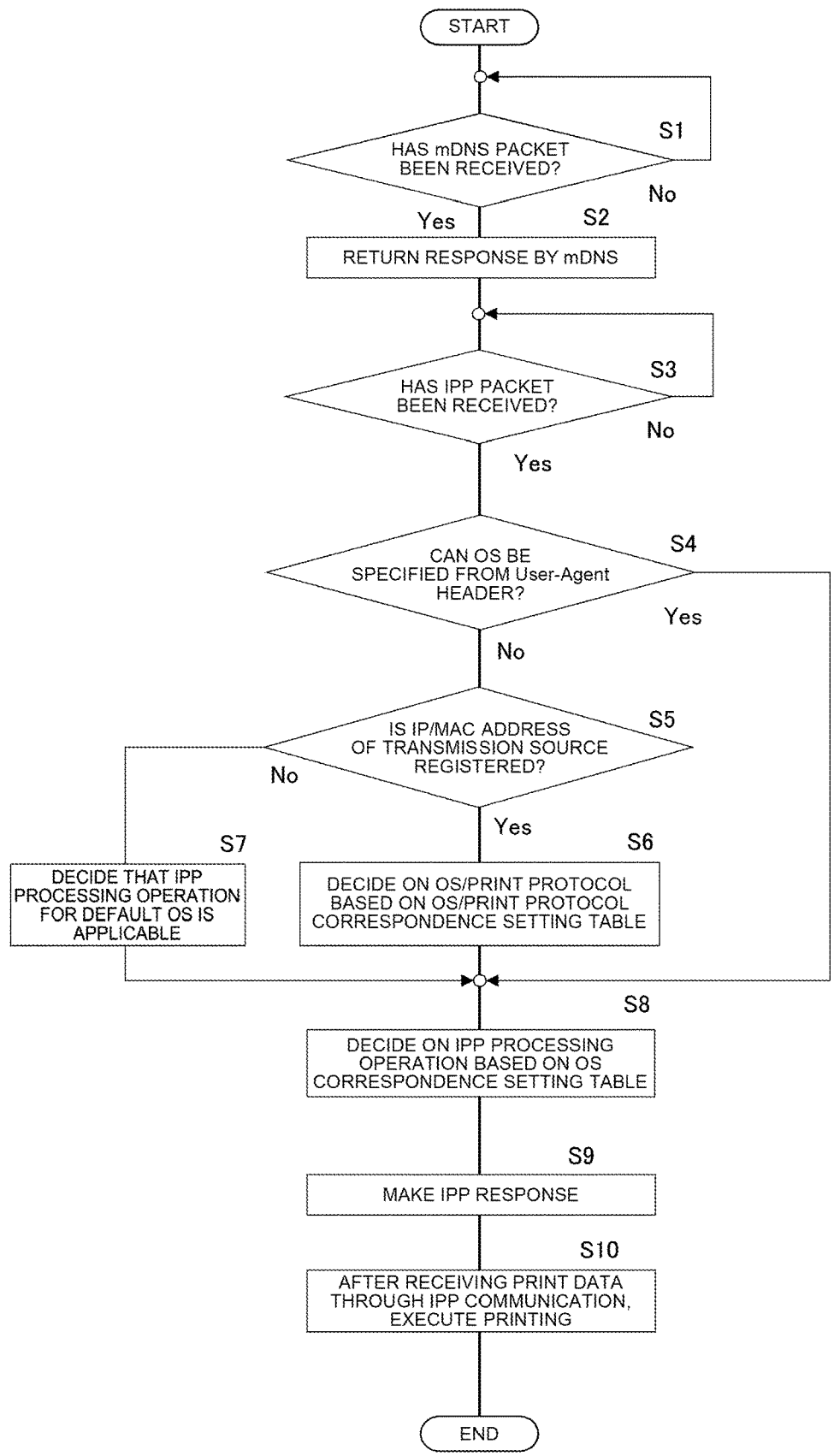
FIG. 3 is a flowchart illustrating an example of a flow of IPP print processing that is executed by the digital multifunction peripheral shown in FIG. 1.

FIG. 3 is a flowchart illustrating an example of a flow of IPP print processing that is executed by the digital multifunction peripheral 1 shown in FIG. 1.

In step S1 of FIG. 3, the controller 10 of the digital multifunction peripheral 1 determines whether or not the communicator 15 has received an mDNS packet (step S1).

If the communicator 15 has received an mDNS packet (i.e., if the determination in step S1 is Yes), in step S2, the controller 10 returns a response by mDNS via the communicator 15 (step S2).

The user terminal 2 transmits, through IPP communication, print data to the digital multifunction peripheral 1 which has been found by a printer search by the mDNS. Various kinds of designation to be made at the time of printing (i.e., the number of copies, color/monochrome, N-in-1 function, etc.) are represented as IPP attributes, and are transmitted as additional information in transmitting the print data through the IPP communication.

Next, in step S3, the controller 10 determines whether or not an IPP packet has been received (step S3).

If an IPP packet has been received (i.e., if the determination in step S3 is Yes), in step S4, the controller 10 causes the packet data analyzer 16 to analyze the received IPP packet, and determines whether or not an OS of the user terminal 2 can be specified from information described in a User-Agent header included in the IPP packet (step S4).

FIG. 4 illustrates an example of the IPP packet received by the digital multifunction peripheral 1 shown in FIG. 1.

In a line starting with "User-Agent:" at the first line from the bottom of a character string of the IPP packet of FIG. 4, "iOS 14.7.1" is described, and the OS can be specified from this description.

In step S4 of FIG. 3, if the OS of the user terminal 2 can be specified (i.e., if the determination in step S4 is Yes), in step S8, the controller 10 decides on an IPP processing operation on the basis of an OS correspondence setting table (step S8).

FIG. 5 illustrates an example of the OS correspondence setting table stored by the digital multifunction peripheral 1 shown in FIG. 1.

In FIG. 5, two types of finishing processing, i.e., "Punch" and "Staple", are named as examples of the function. However, the function is not limited to these two types of finishing processing, and may include other types processing.

In the example of FIG. 5, a setting of choosing ON or OFF for a specific function is defined for each type of OS of the user terminal 2.

For example, when the OS of the user terminal 2 is "iOS 14.7.1" as in FIG. 5, both punching and stapling are set to "ON" in light of the setting of "iOS 14" in the OS correspondence setting table of FIG. 5.

In the example of FIG. 4, as regards punching, "Two Holes on Left" is set to "ON" and "Three Holes on Left" and "Four Holes on Left" are set to "OFF".

Further, as regards stapling, "Upper Left" is set to "ON" and "Two Places on Left" is set to "OFF".

Meanwhile, when the OS of the user terminal 2 is "Windows 10", both punching and stapling are set to "OFF" since the settings correspond to those of "Windows 10" in the OS correspondence setting table of FIG. 5.

As described above, in the finishing processing, since the operations according to each OS are different, the operation is decided for each OS with reference to the OS correspondence setting table of FIG. 5.

In the case of an OS that is not listed in the OS correspondence setting table of FIG. 5, it is assumed that the controller 10 makes the setting of a "default OS" that is defined in advance.

The OS correspondence setting table is stored in advance in the storage 13 of the digital multifunction peripheral 1, and can be updated by a firmware update or an update request from a cloud.

Further, an OS that is not registered in the OS correspondence setting table may be added as a custom OS by the user, and the user may be allowed to make the setting of ON/OFF for an IPP function.

In this case, the added custom OS may be allowed to be deleted by the user.

Details of the setting of the OS correspondence setting table will be described later.

When the IPP processing operation is decided, in step S9 of FIG. 3, the controller 10 makes an IPP response (step S9).

In step S10 that follows, when the communicator 15 receives print data through the IPP communication, the controller 10 causes the image former 12 to form an image based on the print data (step S10), and ends the processing.

In this way, in the IPP communication, when an OS of a transmission source that transmits image data can be specified from IPP packet data, an IPP print operation associated with the OS is decided with reference to a first correspondence table, and the printing is executed. Therefore, it is possible to realize the digital multifunction peripheral 1 which is capable of executing a more appropriate IPP print operation than those executed in the past by adapting to the type of OS of the transmission source that transmits the image data.

Meanwhile, in step S4, if the OS of the user terminal 2 cannot be specified (i.e., if the determination in step S4 is No), in step S5, the controller 10 determines whether or not an IP/MAC address of the user terminal 2, which is the transmission source, is registered (step S5).

FIG. 6 illustrates an example of a user terminal 2-and-OS/print protocol correspondence setting table stored by the digital multifunction peripheral 1 shown in FIG. 1.

As illustrated in FIG. 6, an OS/print protocol, a print protocol, and an operation of the digital multifunction peripheral 1 are associated with an IP address/MAC address of the user terminal 2.

In the example of FIG. 6, the OS, which is "iOS14", the print protocol, which is "AirPrint", and the operation of the digital multifunction peripheral 1, which is "operation for iOS14", are associated with the IP address "10.36.108.103" of the user terminal 2.

In step S5 of FIG. 3, if the IP/MAC address of the user terminal 2, which is the transmission source, is registered in the OS/print protocol correspondence setting table (i.e., if the determination in step S5 is Yes), in step S6, the controller 10 decides on the OS/print protocol on the basis of the OS/print protocol correspondence setting table (step S6).

After that, the controller 10 performs the processing of steps S8 to S10.

In this way, in the IPP communication, when the OS of the transmission source that transmits image data cannot be specified from the IPP packet data, an OS associated with the IP/MAC address of the transmission source is specified with reference to a second correspondence table, an IPP print operation associated with the OS is decided with reference to the first correspondence table, and the printing is executed. Therefore, it is possible to realize the digital multifunction peripheral 1 which is capable of executing a more appropriate IPP print operation than those executed in the past by adapting to the type of OS of the transmission source that transmits the image data.

Meanwhile, in step S5, if the IP/MAC address of the user terminal 2, which is the transmission source, is not registered in the OS/print protocol correspondence setting table (i.e., if the determination in step S5 is No), in step S7, the controller 10 decides that an IPP processing operation for a predetermined default OS is applicable (step S7).

After that, the controller 10 performs the processing of steps S8 to S10.

In this way, in the IPP communication, when the OS of the transmission source that transmits image data cannot be specified from the IPP packet data, based on the assumption that the OS of the user terminal in question is a default OS, an IPP print operation associated with the default OS is decided and the printing is executed. Therefore, it is possible to realize the digital multifunction peripheral 1 which is capable of executing a more appropriate IPP print operation than those executed in the past even in a case where the type of OS of the transmission source that transmits the image data cannot be specified.

Setting of OS Correspondence Setting Table

Next, referring to FIGS. 7 to 10, the setting of the OS correspondence setting table which is made in the digital multifunction peripheral 1 will be described.

FIG. 7 illustrates an example of a setting screen for the OS correspondence setting table that is displayed on the digital multifunction peripheral 1 shown in FIG. 1.

In the example of FIG. 7, various OSes are displayed as a list together with the message "Please select OS to be set" under the title "OS Setting List".

After the user has selected an arbitrary OS from the list, he/she presses an "OK button", whereby the settings in relation to the selected OS can be made.

In the list of OSes in FIG. 7, items from "iOS13 or earlier" to "Default OS" constitute a list of OSes set in advance, and cannot be deleted by the user.

Further, by selecting "Add Custom OS" at the bottom of the list, the user can also add an OS that is not included in the list.

In the list of OSes in FIG. 7, "Custom OS 1" is the OS setting added by the user.

FIG. 8 illustrates an example of a setting change screen for the IPP function in the OS correspondence setting table that is displayed on the digital multifunction peripheral 1 shown in FIG. 1.

In the example of FIG. 8, a case in which the user has selected "iOS14" and pressed the "OK" button is assumed.

As illustrated in FIG. 8, the user can make a setting change for the IPP function of "iOS14" by selecting one of "ON" and "OFF" for each item of the "Finishing", etc., and then pressing an "OK" button.

Meanwhile, in a case where the user selects "Add Custom OS" and presses the "OK" button on the setting screen for the OS correspondence setting table of FIG. 7, the screen transitions to a setting screen for addition of a custom OS.

FIG. 9 illustrates an example of a setting screen for addition of a custom OS to the OS correspondence setting table that is displayed on the digital multifunction peripheral 1 shown in FIG. 1.

As illustrated in FIG. 9, as the user first inputs an arbitrary name ("Custom OS 2" in the example of FIG. 9) in a name field, then selects "ON" or "OFF" for each item of the IPP function, and then presses an "OK" button, a custom OS can be added.

FIG. 10 illustrates an example of a setting screen for deletion of a custom OS from the OS correspondence setting table that is displayed on the digital multifunction peripheral 1 shown in FIG. 1.

As illustrated in FIG. 10, as the user selects an OS to be deleted ("OS of Tanaka's PC at Sales Department" in the example of FIG. 10) from a list of custom OSes that have been registered by addition and presses an "OK" button, the selected custom OS can be deleted.

Setting of User terminal 2-and-OS/Print Protocol Correspondence Setting Table Next, referring to FIGS. 11 to 14, the setting of a user terminal 2-and-OS/print protocol correspondence setting table which is made in the digital multifunction peripheral 1 will be described.

FIG. 11 illustrates an example of a setting screen for the user terminal 2-and-OS/print protocol correspondence setting table that is displayed on the digital multifunction peripheral 1 shown in FIG. 1.

In the example of FIG. 11, a correspondence relationship between the IP address/MAC address of each user terminal 2 and various OSes is displayed as a list together with the message "Please select device" under the title "Device Setting List".

After the user has selected an arbitrary IP address/MAC address from the list, he/she presses an "OK button", whereby the settings in relation to the device in question can be made.

Further, by selecting "Add Device" at the bottom of the list, the user can also add a new device that is not included in the list.

FIG. 12 illustrates an example of an edit screen for device information in the user terminal 2-and-OS/print protocol correspondence setting table that is displayed on the digital multifunction peripheral 1 shown in FIG. 1.

In the example of FIG. 12, a case in which the user has selected the IP address "10.36.45.185" and pressed the "OK" button is assumed.

As illustrated in FIG. 12, the user can have the IP address or the MAC address of the user terminal 2 input in an input field of the IP address/MAC address.

Further, in the item corresponding to OS under the address, as the user presses a triangular button on the right of "Windows 11", selects an arbitrary OS from a list of OSes displayed in a drop-down form, and then presses an "OK" button, the device information can be changed.

Meanwhile, in a case where the user selects "Add Device" and presses the "OK" button on the setting screen for the user terminal 2-and-OS/print protocol correspondence setting table of FIG. 11, the screen transitions to an addition screen for the relevant device information.

FIG. 13 illustrates an example of an addition screen for adding device information in the user terminal 2-and-OS/print protocol correspondence setting table that is displayed on the digital multifunction peripheral 1 shown in FIG. 1.

As indicated in FIG. 13, the user can input the IP address or the MAC address of the user terminal 2 in an input field of the IP address/MAC address.

Further, in the item corresponding to OS under the address, as the user presses a triangular button on the right of "Default OS", selects an arbitrary OS from a list of OSes displayed in a drop-down form, and then presses an "OK" button, the device information can be added.

FIG. 14 illustrates an example of a deletion screen for deleting device information in the user terminal 2-and-OS/print protocol correspondence setting table that is displayed on the digital multifunction peripheral 1 shown in FIG. 1.

As illustrated in FIG. 14, as the user selects an item to be deleted (the IP address "10.36.45.185" in the example of FIG. 14) from a list of IP addresses/MAC addresses and presses an "OK" button, the selected IP address/MAC address can be deleted.

Flow of IPP Print Processing of Digital Multifunction Peripheral 1 According to Embodiment 2 of Present Disclosure Next, referring to FIGS. 15 to 17, a flow of IPP print processing that is executed by a digital multifunction peripheral 1 according to Embodiment 2 of the present disclosure will be described.

In Embodiment 1, it has been described that the embodiment is characterized in that a default IPP processing operation is decided to be applicable when an OS cannot be specified from the information described in the User-Agent header included in the IPP packet or from the IP/MAC address of the user terminal 2, which is the transmission source.

Meanwhile, Embodiment 2 is characterized in that processing of guiding a user to OS registration is performed when an OS cannot be specified from the information described in the User-Agent header included in the IPP packet or from the IP/MAC address of the user terminal 2, which is the transmission source.

A configuration of an image forming system 100 and the digital multifunction peripheral 1 according to Embodiment 2 of the present disclosure is the same as that illustrated in FIGS. 1 and 2 (Embodiment 1), and thus description thereof will be omitted.

Figure 15:
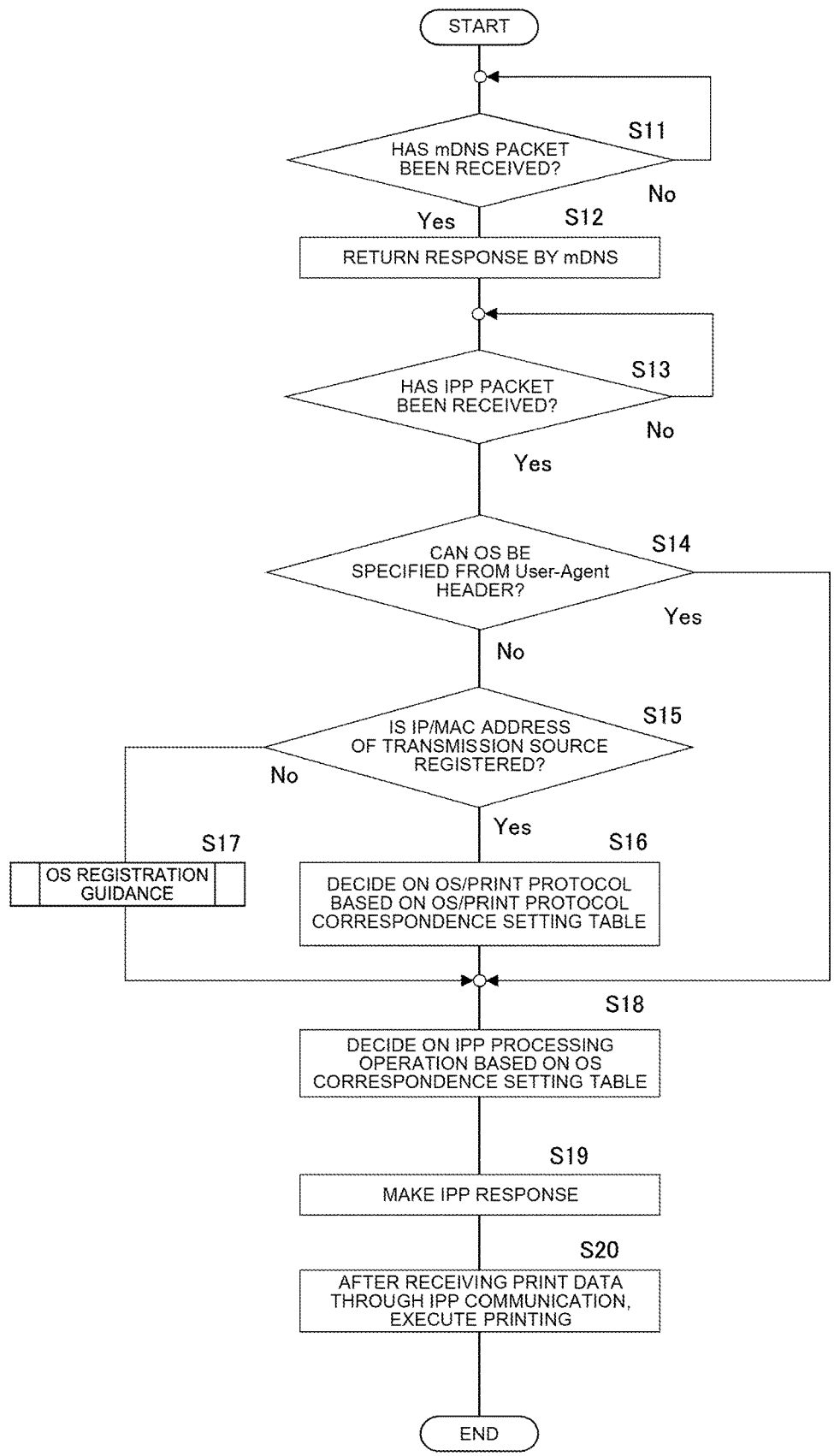
FIG. 15 is a flowchart illustrating an example of a flow of IPP print processing that is executed by a digital multifunction peripheral according to Embodiment 2 of the present disclosure.

FIG. 15 is a flowchart illustrating an example of a flow of IPP print processing that is executed by the digital multifunction peripheral 1 according to Embodiment 2 of the present disclosure.

Since processing items of steps S11 to S16 and S18 to S20 of FIG. 15 correspond to the processing items of steps S1 to S6 and S8 to S10 of FIG. 3 (Embodiment 1), respectively, description of the corresponding processing will be omitted.

Processing of step S17 of FIG. 15, which is different from the processing in FIG. 3, will be described below.

In step S15 of FIG. 15, if an IP/MAC address of a user terminal 2, which is a transmission source, is not registered (i.e., if determination in step S15 is No), in step S17, a controller 10 performs OS registration guidance to the user (step S17).

FIG. 16 is a flowchart illustrating an example of a flow of transmission source OS registration guidance processing that is executed by the digital multifunction peripheral 1 according to Embodiment 2 of the present disclosure.

In step S21 of FIG. 16, the controller 10 causes a display 171 to display a screen to register an OS of a transmission source (step S21).

FIG. 17 illustrates an example of a transmission source OS registration screen that is displayed on the digital multifunction peripheral 1 according to Embodiment 2 of the present disclosure.

In the example of FIG. 17, various OSes are displayed as a list together with the message "IPP packet has been received from a device having IP address (192.168.12.84)—MAC address (81:da:cf:52:33:12). Please select the OS of the device.".

After the user has selected an arbitrary OS from the list, he/she presses an "OK button", whereby the OS of the user terminal 2 can be registered.

Further, in the example of FIG. 17, options, which are "IP address (192.168.12.84)" and "MAC address (81:da:cf:52:33:12)", are displayed as "Address To Be Registered".

As illustrated in the example of FIG. 17, when the user selects one of the addresses, puts a checkmark in a check column for the address to be registered, and presses the "OK" button, the selected address is registered in a user terminal 2-and-OS/print protocol correspondence setting table.

Next, in step S22 of FIG. 16, the controller 10 determines whether or not the OS has been registered (step S22).

If the OS has been registered (i.e., if the determination in step S22 is Yes), in step S23, the controller 10 causes the registered OS to be reflected in an OS correspondence setting table (step S23), and ends the processing.

Meanwhile, if the OS has not been registered (i.e., if the determination in step S22 is No), in step S24, the controller 10 determines whether or not the registration has been cancelled (step S24).

If the registration has been cancelled (i.e., if the determination in step S24 is Yes), in step S25, the controller 10 decides that a default IPP processing operation is applicable (step S25) and ends the processing.

Meanwhile, if the registration has not been cancelled, (i.e., if the determination in step S24 is No), the controller 10 returns the processing to step S22.

In this way, in IPP communication, when an OS of a transmission source that transmits image data cannot be specified from IPP packet data, the display 171 is made to display a list of OSes such that an OS is selectable by the user, and the OS is specified on the basis of a result of input from the user that has been received by an operation receiver 172. Therefore, it is possible to realize the digital multifunction peripheral 1 which is capable of executing a more appropriate IPP print operation than those executed in the past by adapting to the type of OS of the transmission source that transmits the image data.

Flow of IPP Print Processing of Digital Multifunction Peripheral 1 According to Embodiment 3 of Present Disclosure Next, referring to FIGS. 18 to 20, a flow of IPP print processing that is executed by a digital multifunction peripheral 1 according to Embodiment 3 of the present disclosure will be described.

In Embodiment 2, it has been described that the embodiment is characterized in that processing of guiding a user to OS registration is performed when an OS cannot be specified from the information described in the User-Agent header included in the IPP packet or from the IP/MAC address of the user terminal 2, which is the transmission source.

Meanwhile, Embodiment 3 is characterized in that processing of guiding a user to OS registration is performed when a communicator 15 receives an mDNS packet, and an IP/MAC address of a user terminal 2, which is a transmission source, is unregistered.

A configuration of an image forming system 100 and the digital multifunction peripheral 1 according to Embodiment 3 of the present disclosure is the same as that illustrated in FIGS. 1 and 2 (Embodiment 1), and thus description thereof will be omitted.

Figure 18:
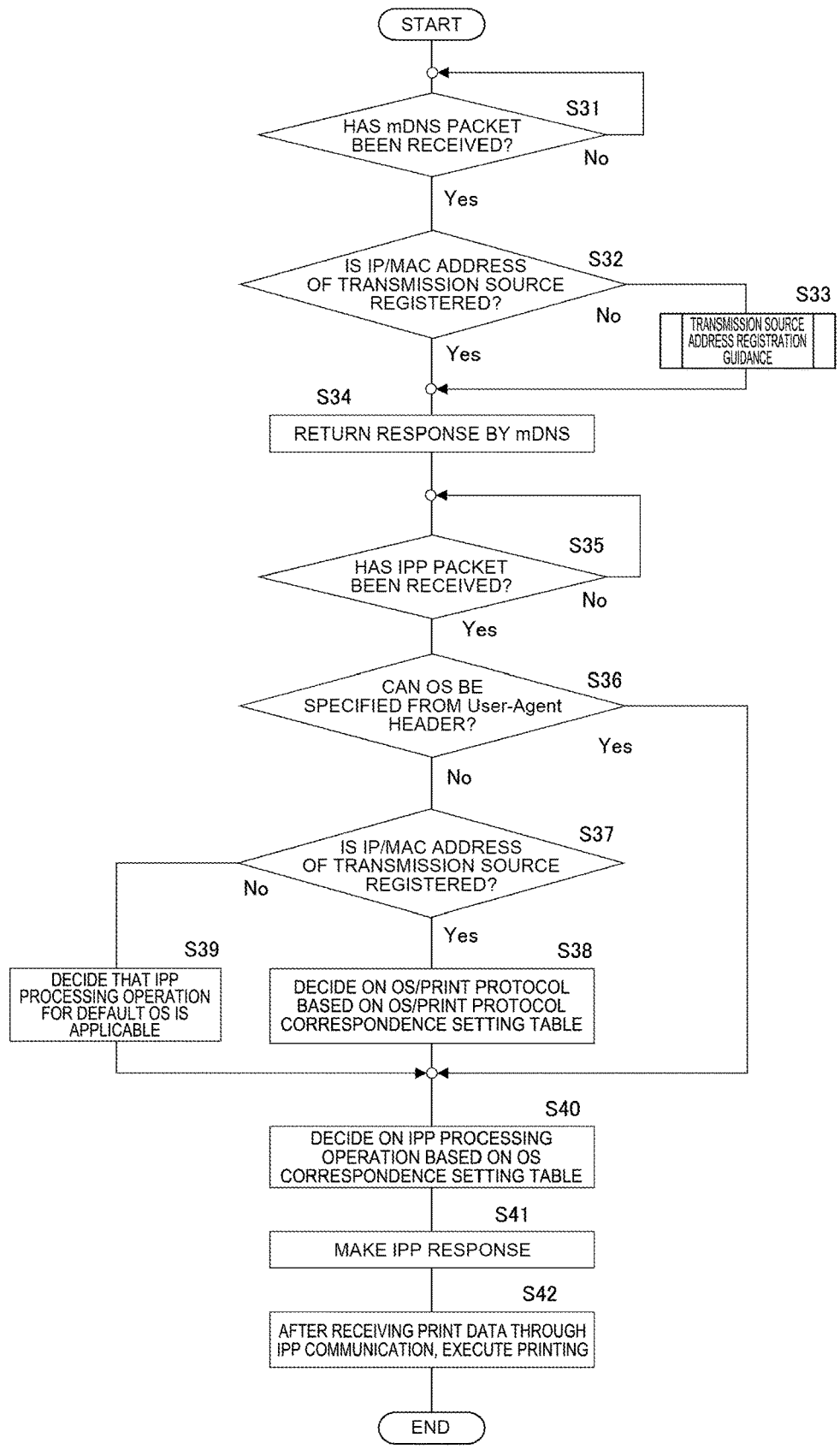
FIG. 18 is a flowchart illustrating an example of a flow of IPP print processing that is executed by a digital multifunction peripheral according to Embodiment 3 of the present disclosure.

FIG. 18 is a flowchart illustrating an example of a flow of IPP print processing that is executed by the digital multifunction peripheral 1 according to Embodiment 3 of the present disclosure.

Since processing items of step S31 and steps S34 to S42 of FIG. 18 correspond to the processing items of steps S1 to S10 of FIG. 3 (Embodiment 1), respectively, description of the corresponding processing will be omitted.

Processing items of steps S32 and S33, which are different from the processing in FIG. 3, will be described below.

In step S31 of FIG. 18, if the communicator 15 has received an mDNS packet (i.e., if determination in step S31 is Yes), in step S32, a controller 10 determines whether or not an IP/MAC address of the user terminal 2, which is the transmission source, is registered (step S32).

If the IP/MAC address of the user terminal 2, which is the transmission source, is registered (i.e., if the determination in step S32 is Yes), in step S34, the controller 10 returns a response by mDNS via the communicator 15 (step S34).

Meanwhile, if the IP/MAC address of the user terminal 2, which is the transmission source, is not registered (i.e., if the determination in step S32 is No), in step S33, the controller 10 performs transmission source address registration guidance to the user (step S33).

Figure 19:
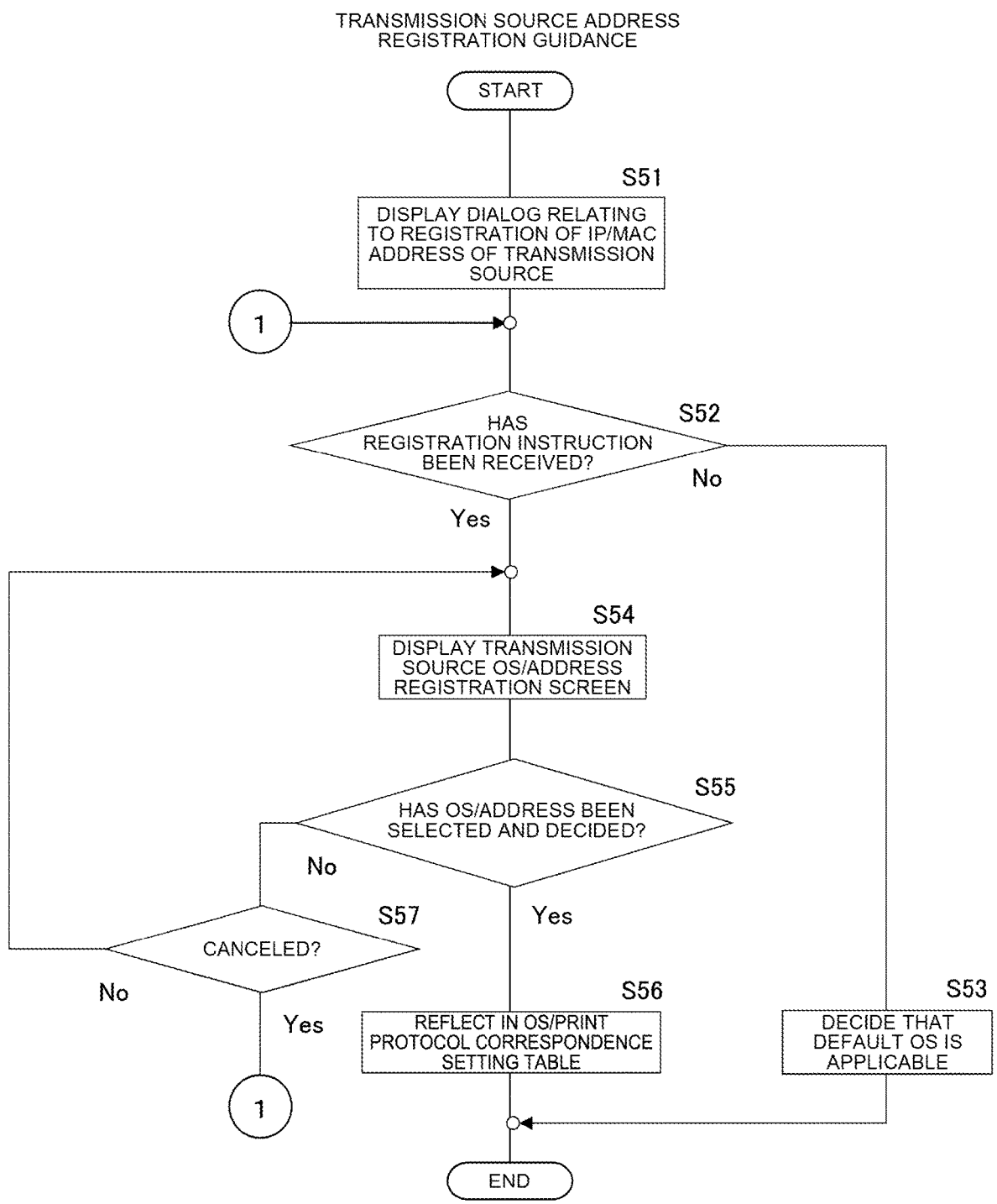
FIG. 19 is a flowchart illustrating an example of a flow of transmission source OS registration guidance processing that is executed by the digital multifunction peripheral according to Embodiment 3 of the present disclosure.

FIG. 19 is a flowchart illustrating an example of a flow of transmission source address registration guidance processing that is executed by the digital multifunction peripheral 1 according to Embodiment 3 of the present disclosure.

In step S51 of FIG. 19, the controller 10 causes a display 171 to display a dialog relating to registration of the IP/MAC address of the transmission source (step S51).

FIG. 20 illustrates an example of a dialog relating to registration of a transmission source OS that is displayed on the digital multifunction peripheral 1 according to Embodiment 3 of the present disclosure.

In the example of FIG. 20, buttons indicating "Register" and "Do not register" are displayed together with the message "mDNS packet has been received from a device having IP address (192.168.12.84)—MAC address (81:da:cf:52:33:12). Do you want to register the OS of the device?".

The user can register the OS of the user terminal 2 by pressing the "Register" button.

FIG. 21 illustrates an example of a transmission source OS registration screen that is displayed on the digital multifunction peripheral 1 according to Embodiment 3 of the present disclosure.

In the example of FIG. 21, various OSes are displayed as a list as "OS To Be Registered". Further, options, which are "IP address (192.168.12.84)" and "MAC address (81:da:cf:52:33:12)", are displayed together with the message "Please select the address to be registered in association with the above OS.".

As illustrated in the example of FIG. 21, when the user selects the OS to be registered, puts a checkmark in a check column for the address to be registered, selects the address, and then presses an "OK" button, registration is made in a user terminal 2-and-OS/print protocol correspondence setting table.

Next, in step S52 of FIG. 19, the controller 10 determines whether or not a registration instruction has been received (step S52).

If no registration instruction has been received (i.e., if the determination in step S52 is No), in step S53, the controller 10 decides that a default OS is applicable (step S53) and ends the processing.

Meanwhile, if a registration instruction has been received (i.e., if the determination in step S52 is Yes), in step S54, the controller 10 displays a screen to register the OS/address of the transmission source (step S54).

In step S55 that follows, the controller 10 determines whether or not the OS/address of the transmission source has been selected and decided by the user (step S55).

If the OS/address of the transmission source is selected and decided by the user (i.e., if the determination in step S55 is Yes), in step S56, the controller 10 reflects the selection result in the OS/print protocol correspondence setting table (step S56) and ends the processing.

Meanwhile, if the OS/address of the transmission source is not selected or decided by the user (i.e., if the determination in step S55 is No), in step S57, the controller 10 determines whether or not the selection and decision have been cancelled (step S57).

If the selection and decision are cancelled (i.e., if the determination in step S57 is Yes), the controller 10 returns the processing to step S52.

Meanwhile, if the selection and decision are not cancelled, (i.e., if the determination in step S57 is No), the controller 10 returns the processing to step S54.

In this way, when the communicator 15 receives an mDNS packet, and an IP/MAC address of the user terminal 2, which is the transmission source, is unregistered, the display 171 is made to display a list of OSes such that an OS is selectable by the user, and the OS is specified on the basis of a result of input from the user that has been received by an operation receiver 172. Therefore, it is possible to realize the digital multifunction peripheral 1 which is capable of executing a more appropriate IPP print operation than those executed in the past by adapting to the type of OS of the transmission source that transmits the image data.

Preferred embodiments of the present disclosure also include those obtained by combining any of the plurality of embodiments described above.

Various modifications may be made to the present disclosure in addition to the embodiments described above. Such modifications should not be construed as falling outside the scope of the present disclosure. The present disclosure should embrace the claims and their equivalents, and all the modifications within the scope of the claims.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image forming apparatus comprising:
   a communicator which transmits and receives various kinds of data to and from an external user terminal via a network;
   an image former which forms an image based on image data received from the user terminal;
   a storage which stores a first correspondence table in which a print operation based on a predetermined print protocol is associated for each of various operating systems of the user terminal;
   a packet data analyzer which analyzes packet data of the print protocol; and
   one or more controllers which control the communicator, the image former, the storage, and the packet data analyzer, wherein:
   when the communicator receives packet data of the print protocol from the user terminal, the one or more controllers cause the packet data analyzer to analyze the packet data and specify a type of the operating system of the user terminal;
   when the type of the operating system of the user terminal was able to be specified, the one or more controllers decide on the print operation based on the print protocol associated with the operating system by referring to the first correspondence table; and
   when the communicator receives image data by the print protocol from the user terminal thereafter, the one or more controllers cause the image former to form an image based on the image data in accordance with the print operation that has been decided.

2. The image forming apparatus according to claim 1, wherein:
   the storage further stores a second correspondence table in which the operating system of the user terminal is associated for each address of the user terminal; and
   when the one or more controllers were unable to specify the type of the operating system of the user terminal, the one or more controllers specify the address of the user terminal, refers to the second correspondence table, and specifies the operating system associated with the address, and
   when the type of the operating system of the user terminal was able to be specified, the one or more controllers refer to the first correspondence table and decides on the print operation based on the print protocol associated with the operating system.

3. The image forming apparatus according to claim 2, wherein:
   the first correspondence table further stores a correspondence relationship between a default operating system and a print operation based on the print protocol; and
   when the one or more controllers were unable to specify the type of the operating system of the user terminal from a result of analysis of the packet data and the address of the user terminal, the one or more controllers assume the operating system of the user terminal as the default operating system, and decides on the print operation based on the print protocol associated with the operating system by referring to the first correspondence table.

4. The image forming apparatus according to claim 2, further comprising:
a display which displays various kinds of information to a user; and
an operation receiver which receives an input operation from the user, wherein
when the one or more controllers were unable to specify the type of the operating system of the user terminal from a result of analysis of the packet data and the address of the user terminal, the one or more controllers cause the display to display a list of the operating systems such that the operating system is selectable by the user, and specifies, based on a result of input from the user received by the operation receiver, the type of the operating system of the user terminal.

5. The image forming apparatus according to claim 2, further comprising:
a display which displays various kinds of information to a user; and
an operation receiver which receives an input operation from the user, wherein
when the communicator receives predetermined search packet data from the user terminal, the one or more controllers specify the address of the user terminal, and when the address is not included in the second correspondence table, the one or more controllers cause the display to display a list of the operating systems such that the operating system is selectable by the user, and specifies, based on a result of input from the user received by the operation receiver, the type of the operating system of the user terminal.

6. A method of controlling an image forming apparatus, the method comprising:
transmitting and receiving various kinds of data to and from an external user terminal via a network;
forming an image based on image data received from the user terminal;
storing a first correspondence table in which a print operation based on a predetermined print protocol is associated for each of various operating systems of the user terminal;
analyzing packet data of the print protocol;
specifying, when packet data of the print protocol is received from the user terminal, a type of the operating system of the user terminal by analyzing the packet data;
deciding on, when the type of the operating system of the user terminal was able to be specified, the print operation based on the print protocol associated with the operating system by referring to the first correspondence table; and
forming, when image data is received by the print protocol from the user terminal thereafter, an image based on the image data in accordance with the print operation that has been decided.

\* \* \* \* \*